United States Patent [19]

Harrington et al.

[11] Patent Number: 5,048,079
[45] Date of Patent: Sep. 10, 1991

[54] SMDR TRANSLATOR

[75] Inventors: Craig J. Harrington, McKinney; Brian W. Johnson, Lucas; Michael S. Miller, Garland; Ronald E. Souder, Arlington, all of Tex.

[73] Assignee: Intellicall, Inc., Carrollton, Tex.

[21] Appl. No.: 565,954

[22] Filed: Aug. 10, 1990

[51] Int. Cl.$^5$ .................. H04M 15/16; H04M 15/28; H04M 15/32
[52] U.S. Cl. .................................. 379/112; 379/119; 379/120; 379/130; 379/140
[58] Field of Search ............... 379/112, 111, 113, 114, 379/119, 120, 130, 140

[56] References Cited

U.S. PATENT DOCUMENTS 4,525,601 6/1985 Barnich et al. ...................... 379/112

Primary Examiner—Stafford D. Schreyer
Attorney, Agent, or Firm—Baker & Botts

[57] ABSTRACT

A telecommunications system 10 is provided which comprises a PBX system 12 coupled to a call processing system 16 through plurality of trunks 14. SMDR data records are received from the PBX system 12 by the call processing system 16 through an SMDR data line 18. The call processing system 16 includes an SMDR translation system which retrieves call records associated with each call placed through the call processing system 16 and matches these call records to SMDR data records received from the PBX system 12. The matched records are used to generate a combined SMDR output record for a particular call which is then output through an output line 30 to a call accounting system 32. In this manner, the call processing system 16 can utilize the information received from the PBX system 12 with the accurate call duration information generated in its own systems to provide for accurate call records associated with each call placed through the call processing system 16.

18 Claims, 11 Drawing Sheets 5,048,079

SMDR TRANSLATOR

TECHNICAL FIELD OF THE INVENTION

This invention relates in general to the field of telecommunications systems and, more particularly, the present invention relates to an improved SMDR translation system and method.

BACKGROUND OF THE INVENTION

PBX systems attempt to keep track of telephone calls placed using the PBX system through the use of station message detail recording systems (SMDR systems). In summary, most SMDR systems record the trunk and extension used for the placement of a call as well as the duration of the call and, the destination number of the call. In many circumstances, the SMDR information must be used to bill for calls placed using the PBX system. For example, in a hotel environment, the only information that the hotel ownership has as to long distance traffic associated with a particular patron of the hotel will be through the SMDR data received from the hotel's PBX system. Unfortunately, SMDR data is extremely inaccurate as to the duration of the call. Virtually all present PBX systems use extremely simple algorithms for determining the completion of a call which can result in both overcharging and undercharging for long distance calls based on inaccuracies in the timing of the calls.

Recent developments in localized answer detect methodology and technology have allowed the development of sophisticated call processing systems which can be situated on the trunk lines between the PBX system and the central office of the telephone company. One such system is the IntelliMax TM system manufactured by Intellicall, Incorporated. These systems can accurately determine the duration of long distance telephone calls as well as recording other information relevant to the amount to be charged for a particular call. However, these systems cannot determine the particular extension from which the call was placed if they are placed on the trunks between the PBX system and the central telephone office. Accordingly, a need has arisen for a system which can receive SMDR serial data from a PBX system and call record data from a call processing system and merge these two sets of data to create an accurate record of telephone calls placed using the PBX and call processing systems which includes the extension number from which the call was placed. In addition, the merged data set associated with a particular telephone call must include the accurate duration of the call measured by the call processing system.

SUMMARY OF THE INVENTION

In accordance with the teachings of the present invention, an SMDR translation system is provided which receives SMDR serial data input from a PBX system and call records from a call processing system. The system of the present invention matches the correct call record to the correct SMDR data record and merges the two data sets to create a combined call record which can be output to a call accounting system. The combined call records include the extension number which is retrieved from the SMDR data records from the PBX system and an accurate duration for the telephone call as well as other billing information retrieved from the call records generated by the call processing system.

According to one specific embodiment of the present invention, a configuration file associated with each PBX system is read by the SMDR translation system of the present system to provide a template for the SMDR data records to be read from the PBX system. In this manner, the system of the present invention enjoys the important technical advantage of being extremely flexible in that it can work with a variety of PBX systems using various data organizational schemes. The configuration file can be used to specify a variety of variables used by a particular PBX system. The configuration file can also specify the order in which the numeric or alphanumeric data is transmitted from the PBX system. The SMDR translation system of the present invention can then read the data and store the appropriate variables such that they can be efficiently used to form the accurate combined call records to be sent to the call accounting system.

According to still another embodiment of the present invention, a probability matrix is used to match the SMDR data records from the PBX system and the call records retrieved from the call processing system. The probability matrix can use a variety of attributes within the received records to assign a probability value to each pairing of a SMDR data record and a call record. In this manner, the pairing with the highest probability value can be used to create the combined call record to be output to the call accounting system. The various attributes used in the operation of the probability matrix are selectable to ensure flexibility of the system with a variety of PBX and call processing systems.

The system of the present invention enjoys the important technical advantage of being capable of translating SMDR data received from a PBX system into the representation or format of a different PBX system or a unique format which could be needed by either a call accounting system or a property management system. Also, because the system of the present invention is capable of adding a rated dollar amount to the output record, it can be used to effectively replace a call accounting system.

BRIEF DESCRIPTION OF THE DRAWINGS

A more complete understanding of the present invention may be derived by referring to the detailed description and claims when considered in connection with the accompanying drawings, in which like reference numbers indicate, like features through the drawings, and wherein:

Figure 6:
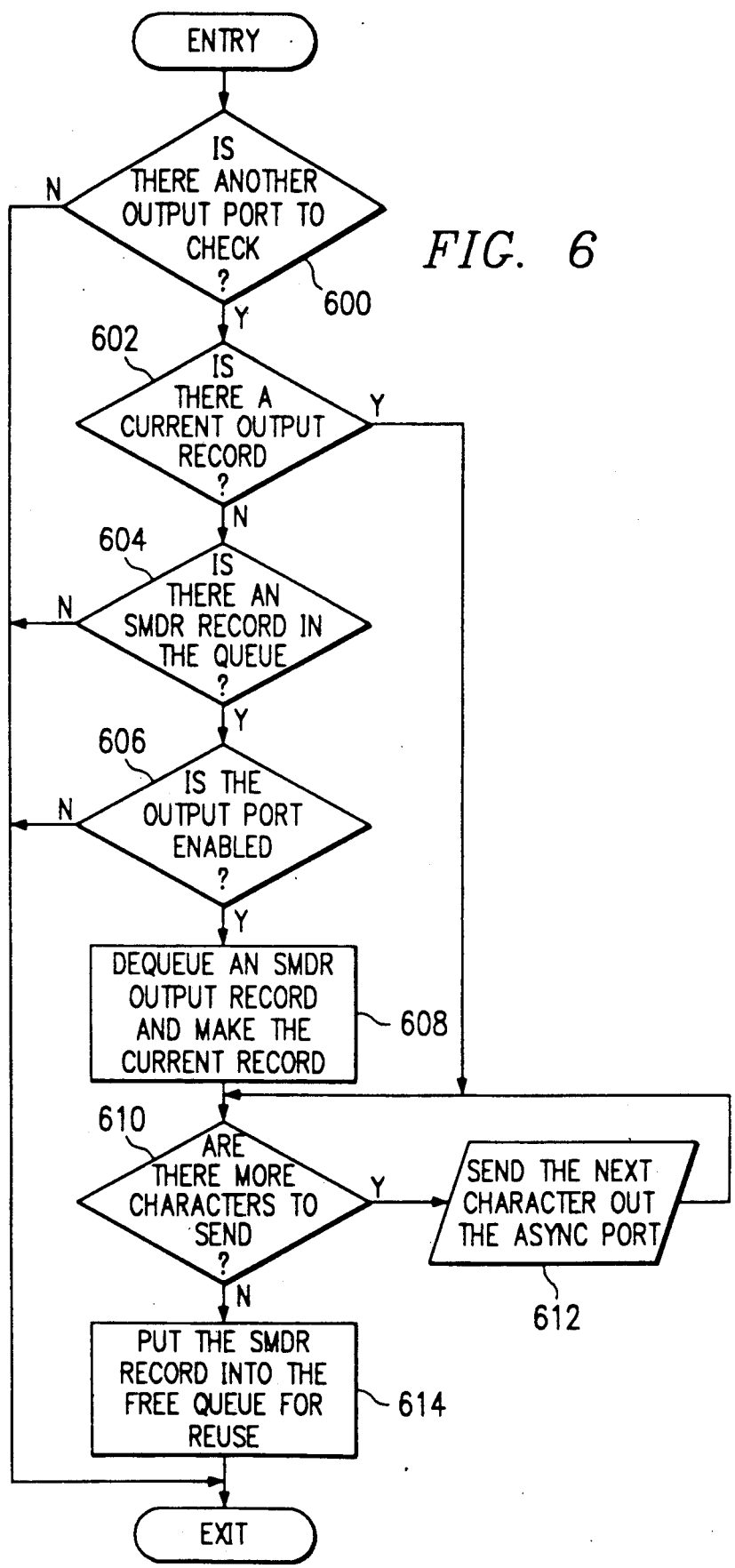

5a through 5b are flow charts showing the matching portion, of the SMDR translation process used in the present invention:

FIG. 6 is a flow chart showing the output portion of the SMDR translation process used in the present invention.

DETAILED DESCRIPTION OF THE INVENTION

Figure 1:
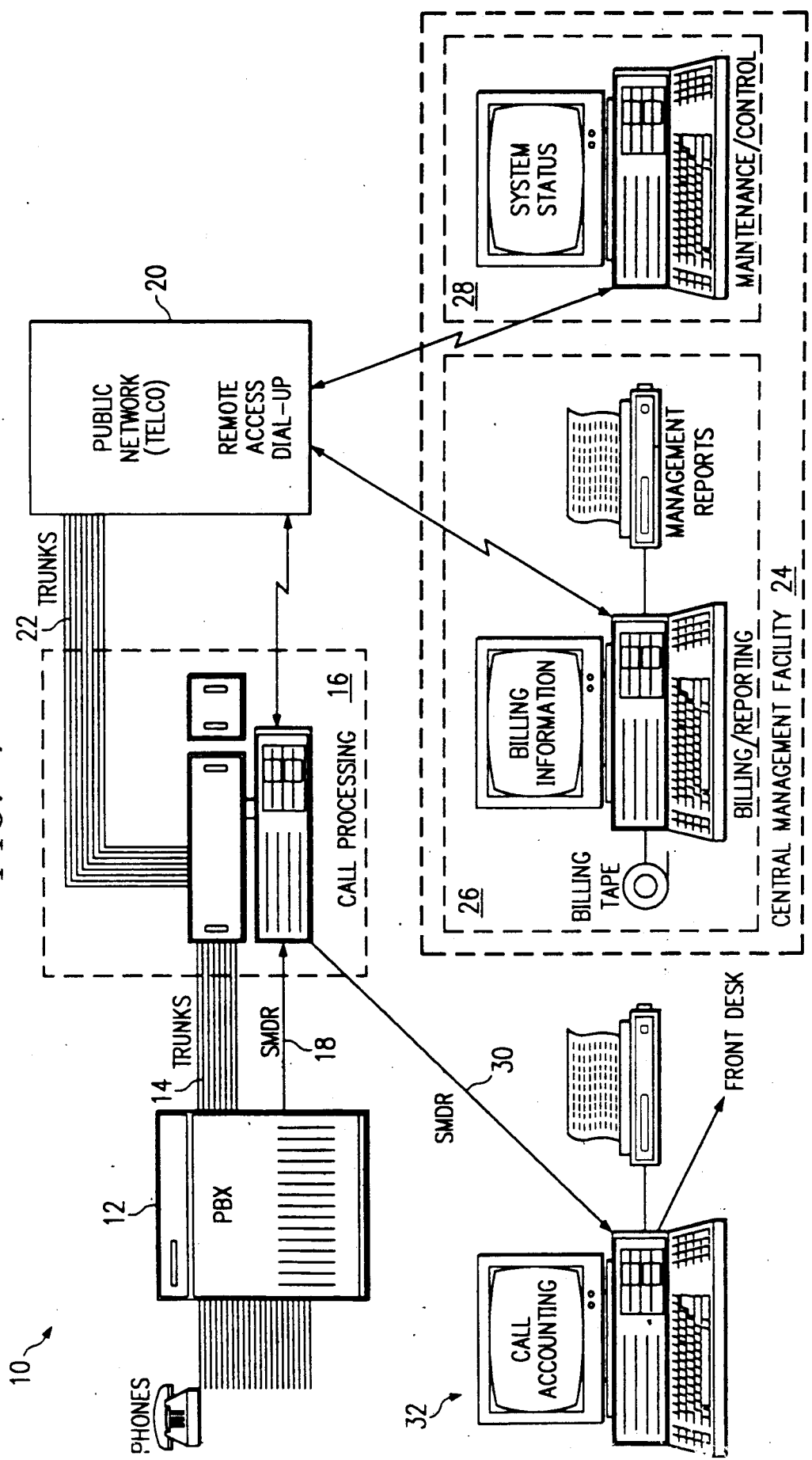
FIG. 1 is a block diagram of a telecommunications system utilizing the SMDR translation system of the present invention.

Referring to FIG. 1, an integrated telecommunications system 10 is illustrated. System 10 comprises a PBX system 12 which is coupled through trunk lines 14 to a call processing system 16. Call processing system 16 also receives serial SMDR data from PBX system 12 through a serial SMDR data line 18 Call processing system 16 is coupled to a telecommunications network central office 20 through trunks 22. Call processing system 16 may also be remotely coupled to a central management facility 24 through the central office 20. Central management facility 24 may comprise, for example, a billing reporting system 26 and a maintenance and control system 28. Call processing system 16 is coupled through an SMDR output line 30 to a call accounting system 32. The call accounting system 32 may comprise a system having the capability to rate and bill for calls or may comprise a property management system which receives a rated call and applies it to a correct account. The system of the present invention is capable of including rating information in the call records it generates. Accordingly, the call accounting system 32 may be eliminated in one embodiment of the present invention by appropriately formatting the records to be output so that they can be sent directly to a front desk printer. The description of the invention herein with reference to the call accounting system 32 should not be construed to limit the scope of the present invention to any particular method of presentation of the records generated and output by the system of the present invention.

In prior art telecommunications systems not comprising a call processing system 16, the SMDR serial data output line 18 would be coupled directly to the call accounting system 32. The incorporation into system 10 of the call processing system 16 allows for more accurate billing of telephone calls placed by PBX system 12. In operation, the SMDR serial data output by the PBX system 12 is received from line 18 into call processing system 16. The SMDR translation system of the present invention is included in call processing system 16. Call processing system 16 may comprise, for example, a suitable personal computer such as an IBM AT compatible system with an Intel 386 SX microprocessor. The SMDR translation system may be operated in the call processing system 16 as a single task in a multi-task environment under a supervisory routine according to known methods. Accordingly, the circuitries and decision making capabilities necessary for the operation of the system of the present invention described herein are resident within the computer system comprising call processing system 16. Call processing system 16 may provide in addition to the SMDR translation function, a variety of automated operator functions, including automated collect calling, credit card calling, voice messaging and other functions.

The call processing system 16 has the ability to accurately time the duration of telephone calls placed by the processing system 16. This is accomplished through the use of complex answer detect methods and technology. The call processing system 16 will generate on a call by call basis a call record which may comprise, for example, the duration of the call, the destination number of the call, a rate associated with the call and other information pertinent to the billing of charges associated with the call. The SMDR translation system of the present invention retrieves the call records generated for each call by call processing system 16 and matches them with the SMDR data records received from the PBX system 12 through line 18. The SMDR translation system of the present invention operating within call processing system 16 may then generate SMDR combined output record associated with each telephone call and output the combined records through SMDR output line 30 to the call accounting system 32. Additionally, as will be discussed herein, the system of the present invention has the capability to "pass-thru" certain selected records without modification as to filter out records entirely which have been generated by the PBX system erroneously.

In order for the SMDR translation system of the present invention to operate with a variety of PBX systems and call accounting systems, it is necessary to provide for the configuration of the data to be input into call processing system 16 on line 18 and to be output from call processing system 16 on line 30. In order to allow for the operation of the system of the present invention with a variety of PBX and call accounting systems, an initialization procedure is provided which includes the reading of a configuration file associated with the particular PBX system and the call accounting system to be used in a particular application of the SMDR translation system. The configuration file provides a template into which the data received on line 18 and output on line 30 is organized. This allows for the efficient communication between the PBX system 12, the call processing system 16 and the call accounting system 32.

Figure 2:
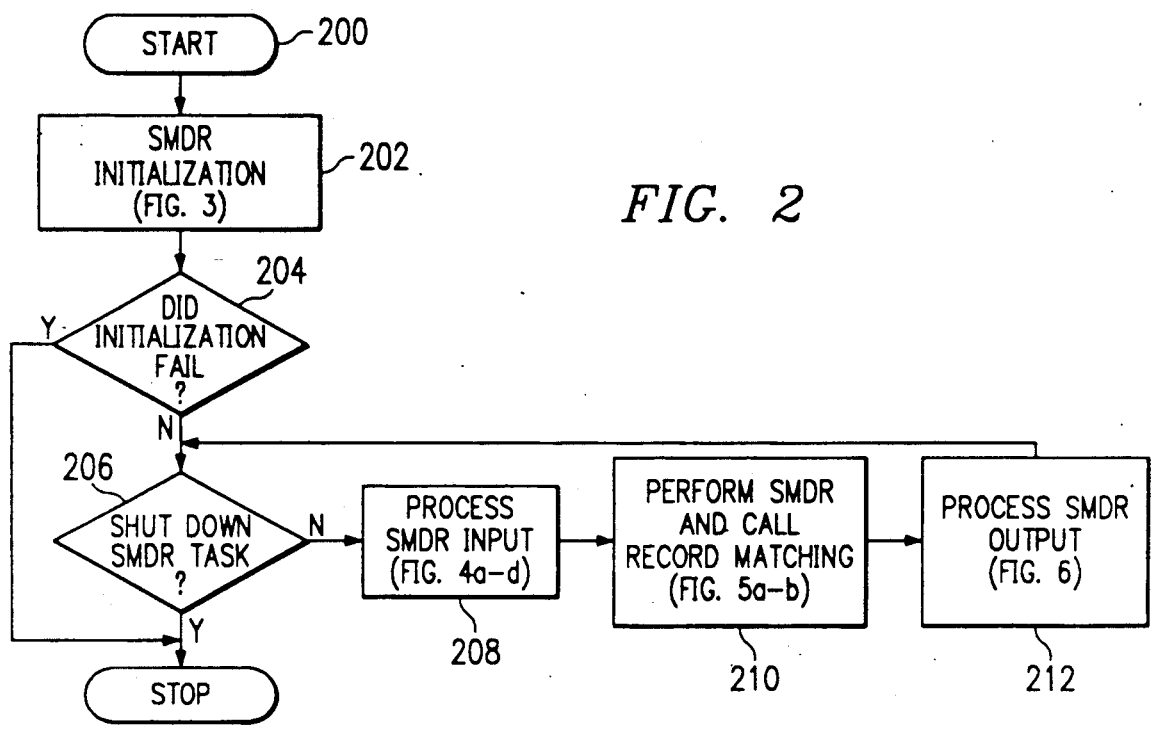
FIG. 2 is an overall flow chart showing the process of translating the SMDR data according to the present invention.

FIG. 2 is a flow chart which provides a general outline of the steps in the SMDR translation process of the present invention. The particular routines briefly described with reference to FIG. 2 will be described in greater detail with reference to FIGS. 3 through 6. The program is initiated at step 200 and proceeds to SMDR initialization at block 202. SMDR Initialization Block 202 comprises the steps of reading and storing the configuration file. The configuration file aids in identifying the SMDR data for processing. A sample configuration file is shown in Table 1.

TABLE 1

INPUT COM4 2400 N 8 1
;
IGNORE OxFF OxOC OxOA
EOR OxOD
CASE 1 NOMATCH
ID     ".:d/.:d/:d:d:s:s..:d:::d:d:a:a:s:s:d:d:s:s..:s:s "
FMT   "%-128s"
ARGS  tx0
CASE 2
ID     " .:d/.:d/:d:d:s:s..:d:::d:d:a:a:s:s:d:d:s:s..:s:s"
FMT   "%2n/%2n/%2n %2n:%2n%2s %2n %1n %-29s $2n:%2n'%2n %4s"
ARGS  onmon,onday,onyr,onh,onm,onap,eqp,tnm,asd, cdh,cdm,cds, tac
CASE 99 NOMATCH
ID     ""
FMT   "%-128s"
ARGS  tx0
;
OUTPUT COM5 2400 N 8 1
;
CASE 0
FMT   "%2n/%2n/%02n %2n:%02n%2S %n %1n TABLE 1-continued

```
         %-28s (case0) %02n:%02n'%02n  " %4s  r  n"
ARGS     onmon,onday,onyr,onh,onm,onap,ext,tnm,asd,
         cdh, cdm, cds, tac
CASE 2
FMT      "%2n/%2n/%02n %2n:%02n%2S %n %1n
         %-28s $%5.2n %02n:%02n'%02n  " %4s  r  n"
ARGS     onmon,onday,onyr,onh,onm,onap,ext,tnm,
         asd, chg, cdm, cds, tac
CASE 1
FMT      "%-s  r  n"
ARGS     tx0
CASE 97 ERRLOG
FMT      "ISM ERROR: %-s  r  n"
ARGS     tx0
CASE 98 MAINT
FMT      "ISM MAINT: %-s  r  n"
ARGS     tx0
CASE 99
FMT      "%-s  r  n"
ARGS     tx0
```

Figure 3:
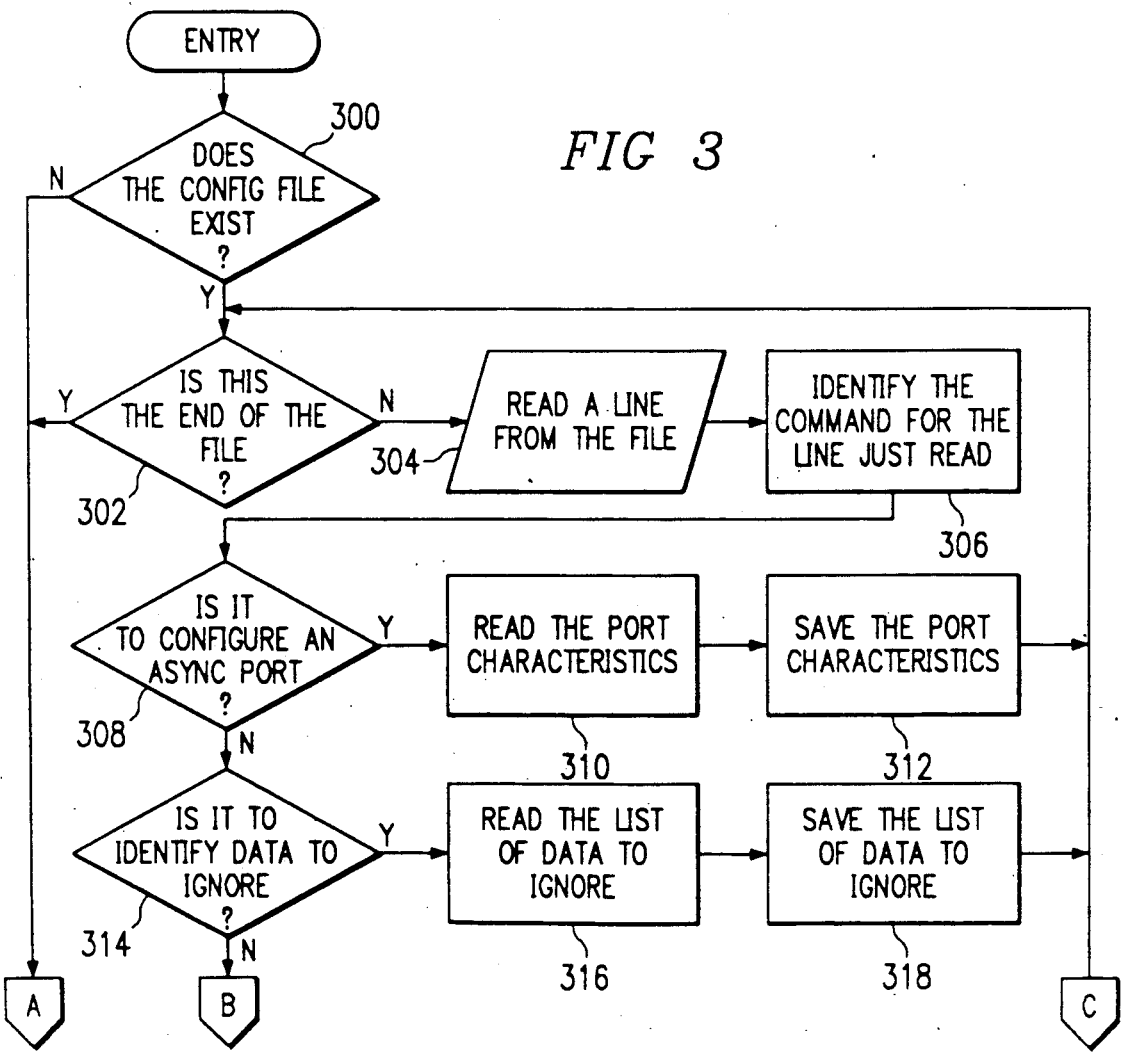
FIG. 3 is a flow chart showing the initialization portion of the SMDR translation process used in the present invention.
Figure 3:
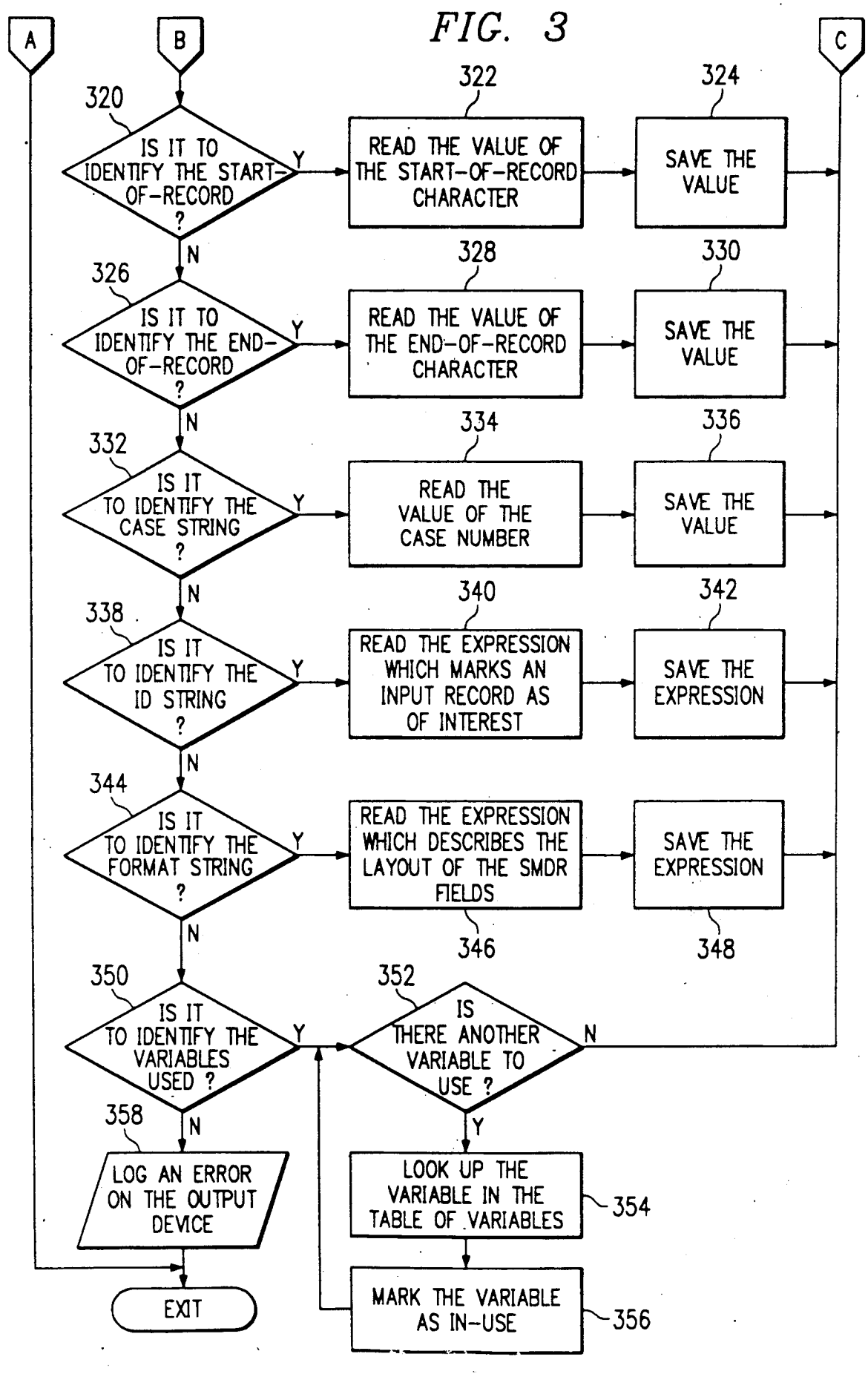

A particular configuration file corresponds to a particular PBX system and a particular call accounting system and is necessary for the efficient communication of the data records during operation of the system of the present invention. FIG. 3 more particularly points out the steps comprising SMDR Initialization Block 202. In general, the configuration file together with steps taken in SMDR initialization step 202 provide a template for the SMDR data to be processed by identifying the variables used by particular PBX and call accounting systems and the order in which the PBX system presents the SMDR data to the translation system through data line 18. The configuration file also details the order in which the combined records are to be presented to the call accounting system on line 30.

It should be understood that the capabilities of the system of the present invention provide that the output from a particular PBX system 12 need not be in a format suitable to communicate with a particular call accounting system 32. The system of the present invention can translate any format of information received from the PBX system 12 to a format which can be interpreted by the call accounting system 32 through the use of an appropriately structured configuration file. For example, SMDR data from a Hitachi Digital DX PBX system can be used to provide HOBIC style output to a H.I.S. property management system through the translation capability of the system of the present invention.

Referring to FIG. 2, program flow proceeds from step 202 to Step 204 which checks for the occurrence of initialization. If initialization did not occur, for example, if the configuration file was corrupted or missing altogether, then the program terminates. Step 206 allows for the operator or a supervisory routine to terminate the program. The SMDR translation system of the present invention may be run as a single task in a multi-tasking environment. Step 206 allows for control to return to a supervisory program to run other tasks if necessary.

If the program continues, program flow proceeds to SMDR input block 208. In general, SMDR input block 208 comprises the steps of reading the SMDR data from the PBX system 12 and storing the data into an appropriately organized buffer within call processing system 16. When an entire SMDR record is received, the data is segregated and placed in appropriate variable buffers.

A list of some of the variables which are commonly used in present PBX systems is shown in Table 2.

TABLE 2

Common SMDR Variables

Time-Of-Day

PC time-of-day variables:

| | | |
|---|---|---|
| NUMERIC | pcday | day of month |
| NUMERIC | pcmon | month of year |
| NUMERIC | pcyr | year since 1900 |
| NUMERIC | pct | pc time-of-day (24) hour (0-23) |
| NUMERIC | pch | pc time-of-day (12) hour (1-12 a or p) |
| NUMERIC | pcm | pc time-of-day minute |
| NUMERIC | pcs | pc time-of-day second |
| NUMERIC | pcp | pc time-of-day AM/PM (12 hour) |

Offhook time-of-day variables:

| | | |
|---|---|---|
| NUMERIC | ofday | day of month |
| NUMERIC | ofmon | month of year |
| NUMERIC | ofyr | year since 1900 |
| NUMERIC | oft | offhook time-of-day (24) hour (0-23) |
| NUMERIC | ofh | offhook time-of-day (12) hour (1-12 a or p) |
| NUMERIC | ofm | offhook time-of-day minute |
| NUMERIC | ofs | offhook time-of-day second |
| NUMERIC | ofp | offhook time-of-day AM/PM (12 hour) |

Connect time-of-day variables:

| | | |
|---|---|---|
| NUMERIC | ctday | day of month |
| NUMERIC | ctmon | month of year |
| NUMERIC | ctyr | year since 1900 |
| NUMERIC | ctt | connect time-of-day (24) hour (0-23) |
| NUMERIC | cth | connect time-of-day (12) hour (1-12 a or p) |
| NUMERIC | ctm | connect time-of-day minute |
| NUMERIC | cts | connect time-of-day second |
| NUMERIC | ctp | connect time-of-day AM/PM (12 hour) |

Onhook time-of-day variables:

| | | |
|---|---|---|
| NUMERIC | onday | day of month |
| NUMERIC | onmon | month of year |
| NUMERIC | onyr | year since 1900 |
| NUMERIC | ont | onhook time-of-day (24) hour (0-23) |
| NUMERIC | onh | onhook time-of-day (12) hour (1-12 a or p) |
| NUMERIC | onm | onhook time-of-day minute |
| NUMERIC | ons | onhook time-of-day second |
| NUMERIC | onp | onhook time-of-day AM/PM (12 hour) |

Duration

Offhook duration variables:

| | | |
|---|---|---|
| NUMERIC | odh | offhook duration hours |
| NUMERIC | odm | offhook duration minutes |
| NUMERIC | ods | offhook duration seconds |
| NUMERIC | odd | offhook duration total second (incl hr & min) |
| NUMERIC | odt | offhook duration minutes (incl sec, excl hr) |
| NUMERIC | odn | offhook duration minutes (incl sec & hr) |

Connect duration variables:

| | | |
|---|---|---|
| NUMERIC | cdh | connect duration hours |
| NUMERIC | cdm | connect duration minutes |
| NUMERIC | cds | connect duration seconds |
| NUMERIC | cdd | connect duration total seconds (incl hr & min) |
| NUMERIC | cdt | connect duration minutes (incl sec, excl hr) |
| NUMERIC | cdn | connect duration minutes (incl sec & hr) |

Miscellaneous

Miscellaneous Variables

| | | |
|---|---|---|
| STRING | a10 | up to a 10 digit number without dashes, blanks or 0's or 1's |
| STRING | asd | as-dialed string with dashes |
| STRING | ase | as-dialed string without dashes |
| NUMERIC | eqp | equipment number lookup |
| NUMERIC | ext | extension number |
| NUMERIC | exg | extension group |
| NUMERIC | tnm | trunk number |
| NUMERIC | trg | trunk group |
| STRING | tac | trunk access string |
| STRING | ccn | credit card number string |
| NUMERIC | rte | rate of call (before taxes) |
| STRING | chg | total charges (rate + taxes) |
| STRING | bor | beginning of record character (from SMDR.CFG) |
| STRING | eor | end of record character (from SMDR.CFG) |
| STRING | bt | call record bill type code |
| STRING | ct | call record call type code |

TABLE 2-continued

Common SMDR Variables

| | |
|---|---|
| STRING ms | call record message service code |
| STRING ev | call record event code |
| STRING cc | call record credit card type code |
| STRING tod | call record time-of-day (discount period) code |

Unprocessed

| Unprocessed variables | |
|---|---|
| STRING tx0 | unprocessed text string |
| STRING tx1 | unprocessed text string |
| STRING tx2 | unprocessed text string |
| STRING tx3 | unprocessed text string |
| STRING tx4 | unprocessed text string |
| STRING tx5 | unprocessed text string |
| STRING tx6 | unprocessed text string |
| STRING tx7 | unprocessed text string |
| STRING tx8 | unprocessed text string |
| STRING tx9 | unprocessed text string |
| NUMERIC nm0 | unprocessed number |
| NUMERIC nm1 | unprocessed number |
| NUMERIC nm2 | unprocessed number |
| NUMERIC nm3 | unprocessed number |
| NUMERIC nm4 | unprocessed number |
| NUMERIC nm5 | unprocessed number |
| NUMERIC nm6 | unprocessed number |
| NUMERIC nm7 | unprocessed number |
| NUMERIC nm8 | unprocessed number |

The variables listed in Table 2 are used by PBX systems to communicate various information relevant to calls placed by the PBX. For example, there are variables detailing the time and date of the beginning and ending of a call which can be used to calculate the duration of a call and any applicable time-of-day discounts. The unprocessed variables may be used to store information which is not necessary for a particular call accounting system used in a specific application. The particular steps comprising SMDR input block 208 are more particularly pointed out in FIGS. 4a-4d.

Once the SMDR data has been received, program flow proceeds to SMDR Matching Block 210. At block 210, the SMDR records received from the PBX system 12 are checked against the call records generated by the call processing system 16 to determine if a match exists. If there is a match, the call record and the SMDR record are removed from the queue system in order to generate a single combined record associated with a particular telephone call. SMDR Matching Block 210 is described in greater detail in FIGS. 5a-5b.

After a combined record or a number of records are generated, or after a pass-thru record is processed and placed on the output queue, program flow continues to SMDR Output Block 212. The records in the output queue are transmitted over the serial data line 30 to the call accounting system 32. These records may comprise combined records or pass-thru records. The combined records comprise data taken from the matched call records and SMDR records. The pass-thru records, as will be discussed herein, comprise records which are selectively not modified by the system of the present invention. SMDR Output Block 212 is described in greater detail in FIG. 6. Program flow returns to SMDR Input Block 208 unless the program is terminated at step 206.

FIG. 3 is a flow chart showing the steps performed when program flow enters SMDR Initialization Block 202. At step 300, a check is made to determine whether the configuration file exists. If a valid configuration file does not exist, initialization will fail and the program will be terminated. A configuration file must be manually developed and stored in the call processing system 16 in order for the system of the present invention to operate. Table 1 illustrates an example of a configuration file. Upon finding a valid configuration file, program flow proceeds to step 302 to check for the end of the file. Step 302 comprises the exit point of a loop which essentially reads the configuration file line by line until a "end of file" designation is located. If an "end of file" designation is located in step 302, program flow exits and returns to step 204 shown in FIG. 2. If no "end of file" designation is located at step 302, program flow continues to step 304 where a line is read from the configuration file and then to step 306 where the command for that line is identified. The command is the first word or expression found on each line of the configuration file. At step 308, if the command is to configure an asynchronous data port, the port characteristics expressed in this command line are read at step 310 and then saved at step 312. An asynchronous data port may comprise, for example, an input port coupled to line 18 or output port coupled to line 30 for the transfer of SMDR records or the combined call records, respectively. Referring to Table 1, the first line of the exemplary configuration file identifies an input port as the COM4 port. The characteristics of the data transfer at this port are then identified as being a 2400 baud transfer rate with no parity, 8 data bits and one stop bit. It should be understood that the codes illustrated in Table 1 are merely illustrative of a variety of ways the required configuration information could be communicated using methods known in the art and should not be construed to limit the scope of the present invention to the embodiment shown.

If the command is to "ignore" certain data, step 314 directs program flow to step 316 where the value of the input SMDR data to be ignored is read and then to step 318 where the value of the input SMDR data to be ignored is saved. An exemplary IGNORE statement is shown in the third line of Table 1 where certain hexadecimal commands are identified to be ignored during the processing of SMDR data. The specific commands identified in the example shown in Table 1 are commands which initiate form or line feeds when a PBX is communicating directly with a printer.

If a "start of record" command is identified, step 320 directs the program flow to step 322 where the start of record character is read and then to step 324 where the character is saved. A "start of record" character is issued by some PBX systems to identify the beginning of transmission of an SMDR record. Similarly, if an "end of record" command is identified, step 326 directs the program flow to step 328 where the end of record character is read and then to step 330 where the "end of record" character is saved. The example shown in Table 1 does not contain either of these commands.

If the "case" command is identified, step 332 directs program flow to step 334 where the case number is read and to step 336 where the case number is saved. If an "ID" command is identified, step 338 directs program flow to step 340 where the ID expression is read and to step 342 where the ID expression is saved. If the "format" command is identified, step 344 directs program flow to step 346 where the format expression is read and to step 348 where the format expression is saved. If the "ARGS" command is identified, step 350 directs program flow to a variable loop. Step 352 checks for a variable on the ARGS line, the location specified in memory for the variable is located at step 354, and in step 356 the variable is marked as being in use.

The Case, ID and FMT expressions describe a template for the SMDR records which will be output by the PBX system 12 and for the combined call records to be output to the call accounting system 32. An ID expression associated with a particular Case number gives a data type overlay which the system 16 uses to identify portions of data which are of interest or are not of interest. For example, in the exemplary configuration file shown in Table 1, the ID expression following Case 1 identifies a particular order of data (d) and alphanumeric or string (s) characters which are known to be a portion of a report which is not of interest. Accordingly, the FMT instruction which immediately follows the Case 1 expression allows for the reading of the entire line into a text variable which may be discarded or passed through without modification. In contrast, the ID statement associated with Case 2 in Table 1 identifies a line of data which contains valuable SMDR information. Accordingly, the FMT instruction which follows identifies the locations of the numbers or alphanumeric characters which are to be stored under the variable names listed in the ARGS statement which follows. For example, a 2 digit numeric value will be found at the beginning of a Case 2 line and will be stored in the "onmon" variable. Referring to the list of common variables shown in Table 2, it can be seen that "onmon" helps to identify the time a patron went on hook during a call by storing the numeric equivalent of the month the patron went on hook. In this manner, the configuration file provides a template by which the data from a particular PBX system can be sorted and stored using appropriate variables and by which the data to be transmitted to a particular call accounting system may be appropriately organized. The Case, FMT and ARGS statements for the organization of the combined records to be output to the call accounting system 32 follow the OUTPUT statement in Table 1 and are processed in an identical manner as described previously with reference to the statements associated with the SMDR data records input from PBX system 12.

Once all the variables on the ARGS line have been marked as in use, step 352 directs program flow back to step 302. Program flow will also return back to step 302 after one of the other previous commands has been identified and its characteristics read and saved. Step 302 checks for the end of the configuration file. If the end of the file has not been reached, the program flow proceeds again through step 304 where a new line of the configuration file is read and to step 306 where the command for the new line is identified and processed as described previously.

If at step 302 the end of the file is found, program flow proceeds out of SMDR initialization block 202 to step 204 in FIG. 2. If a command is not identified in steps 306 through 350, step 358 will cause an error message to be logged on the output device. Program flow will then proceed from step 358 out of SMDR Initialization Block 202 to step 204 in FIG. 2. Step 204 determines whether initialization has failed. The initialization process can fail if no valid configuration file exists or if a command within a configuration file cannot be identified. If this occurs, the program will terminate. If initialization is successful, program flow proceeds to step 206 where the operator or a supervisory program in a multitasking environment can terminate the program. If the program is not terminated, program flow proceeds to SMDR Input Block 208.

FIGS. 4a through 4d illustrate the steps which comprise SMDR input block 208. In general, block 208 describes the method by which the system of the present invention receives SMDR data from PBX system 12 and stores that data for later matching with call records generated by the call processor system 16. Program flow enters FIG. 4a at step 400. If the input ports are turned off at step 400, then step 402 checks to see if an input queue is full. The input and output queue may comprise areas of memory within call processing system 16 which are allotted as buffers to store data received from PBX system 12 or data to be output to call accounting system 32. If the input queue is not full, then the input ports will be turned on at step 404. If the input queue is full, then new data cannot be received and the input ports will remain off. If at step 400 the input ports are on, then step 406 checks the input queue. If the input queue is full, then step 408 will disable the input ports since no new data can be received. If the input queue is not full, then the input ports will remain on. After this adjustment, step 410 checks the input port again, and if the input ports are disabled, program flow will exit out of SMDR Input Block 208. If the input ports are on, program flow proceeds to step 412 which looks for an "end-of-record" character. As described previously, the "end of record" character insures that the input process will begin at the beginning of an SMDR record and will not input only a portion of a record. If an "end-of-record" character is not found within a specified time period, then program flow proceeds to step 416 where an artificial "end-of-record" character is created. The artificial "end-of-record" character is then processed at block 420. If at step 412 an end-of-record character is received before the time period runs out, then program flow proceeds to step 414. If there is no data on the input port at step 414, then program flow exits SMDR Input Block 208. If data is present at the input port, program flow proceeds to step 418 where a character is retrieved from the input port and then processed at block 422. After the character is processed, step 424 determines whether it is an "end-of-record" character. If so, then the program exits SMDR Input Block 208. If not, then program flow loops back to step 414 and once again checks for data at the input port.

Figure 4A:
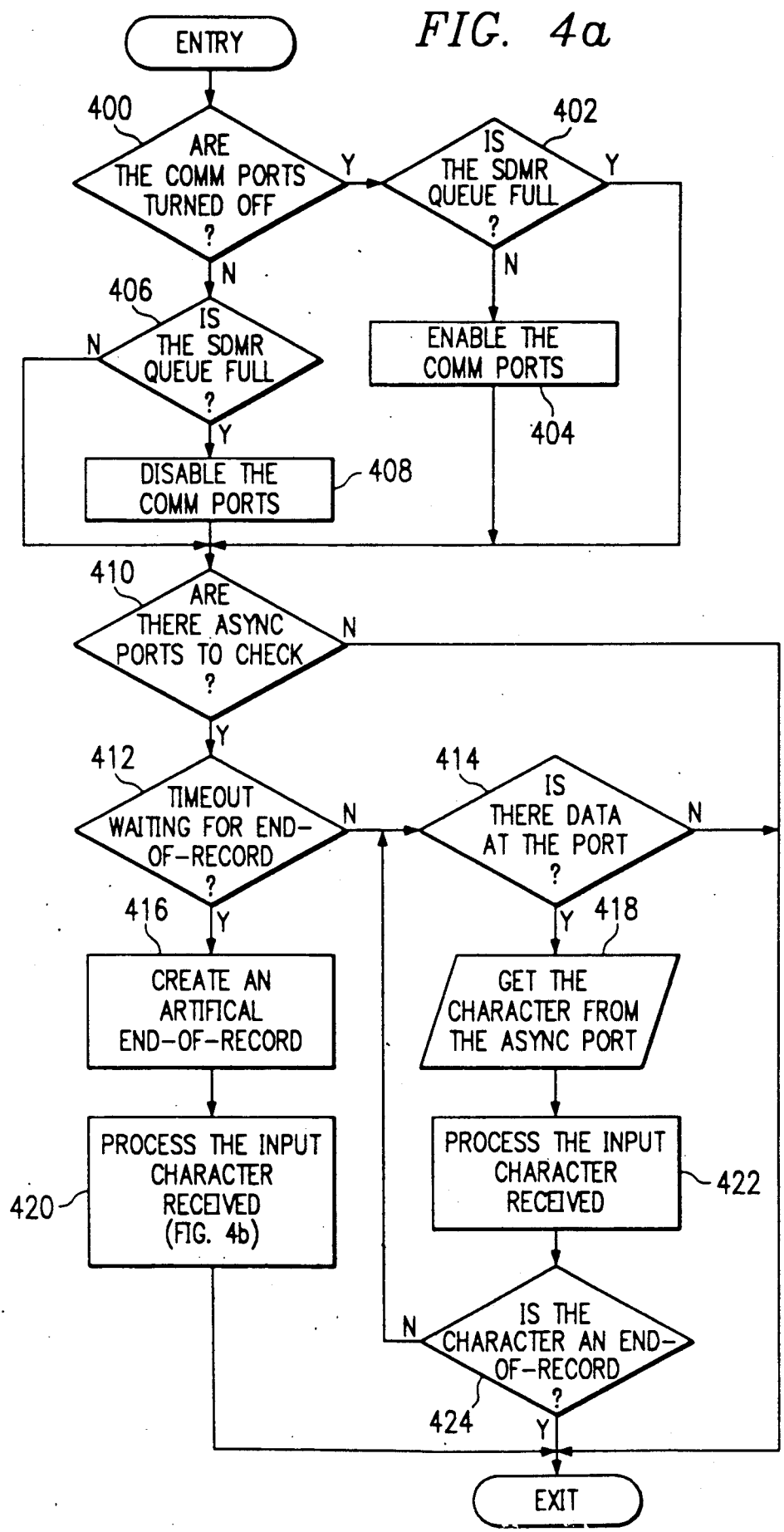
FIGS. 4a through 4d are flow charts showing the input portion of the SMDR translation process used in the present invention.
Figure 4B:
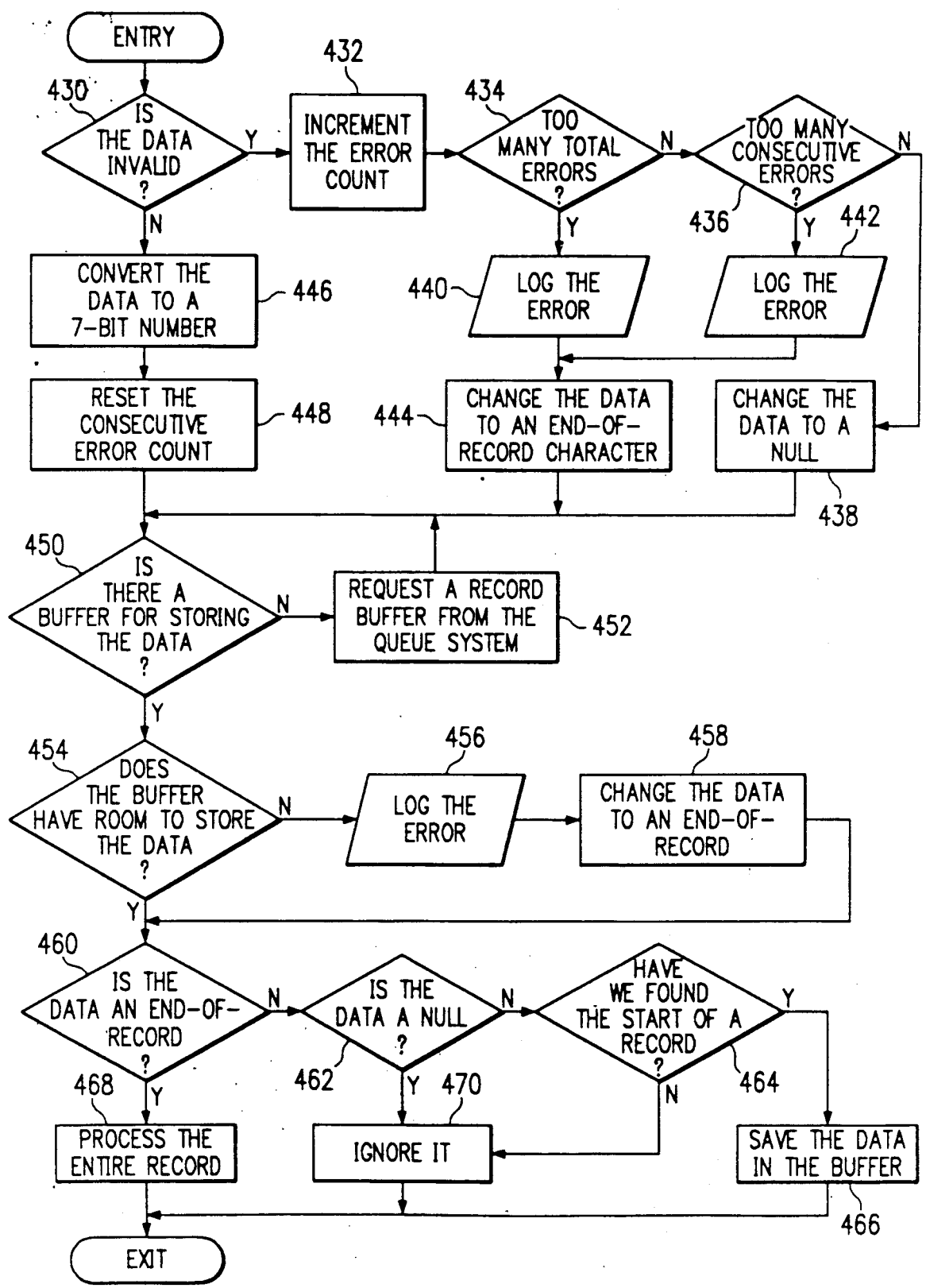

Data from the input port and the artificial "end-of-record" are processed in blocks 422 and 420, respectively. FIG. 4b illustrates the steps taken in both Process Blocks 420 and 422. Program flow enters at step 430 where the data received from the input ports is checked for validity. If the data is valid, the data is converted to a seven bit number at step 446, and a consecutive error count is then reset at step 448, and then program flow proceeds to step 450. If the data is invalid, the error count is incremented at step 432 and the total number of errors is checked at step 434. If too many total errors have occurred, program flow proceeds to step 440 where the error is logged and then to step 444 where the data is changed to an artificial "end-of-record" character before continuing on to step 450. If the total number of errors is not too large, then step 436 polls the number of consecutive errors. If the number of consecutive errors is too large, program flow proceeds to step 442 where the error is logged, then to step 444 where the data is changed to an artificial "end-of-record" character before proceeding to step 450. If the data was invalid, but the number of total errors and the number of consecutive errors were not too large, program flow reaches step 438 where the data is changed to a "null" character before continuing to step 450.

At step 450, the system checks for a record buffer to store an input character. If a record buffer is not available, program flow proceeds to step 452 which requests a record buffer and then loops back to step 450. Once a record buffer is found at step 450, program flow proceeds to step 454 where an inquiry is made whether the buffer has room to store the data. If there is not enough room in the buffer, program flow proceeds to step 456 where an error is recorded and then to step 458 where the data is changed to an artificial "end-of-record" character before proceeding to step 460. If there was room in the buffer at step 454 or following step 458, program flow proceeds to step 460 which checks for an "end-of-record" character. If the data is not an "end-of-record" character, then step 462 will check the data for a null character. If a "null" character is found, program flow proceeds to step 470 where the "null" character is ignored. If a "null" character is not found, then program flow proceeds to step 464 where a check is made for the start of a record. If a start of a record has not been found, then program flow proceeds to step 470 where the data is ignored again. If a start of record has been found, then program flow proceeds to step 466 where the data is saved in the buffer requested. From either step 466 or 470, program flow exits out of process block 422 and proceeds to step 424 in FIG. 4a. If an "end-of-record" character was found at step 460, program flow proceeds to block 468 where the entire record is processed.

Figure 4C:
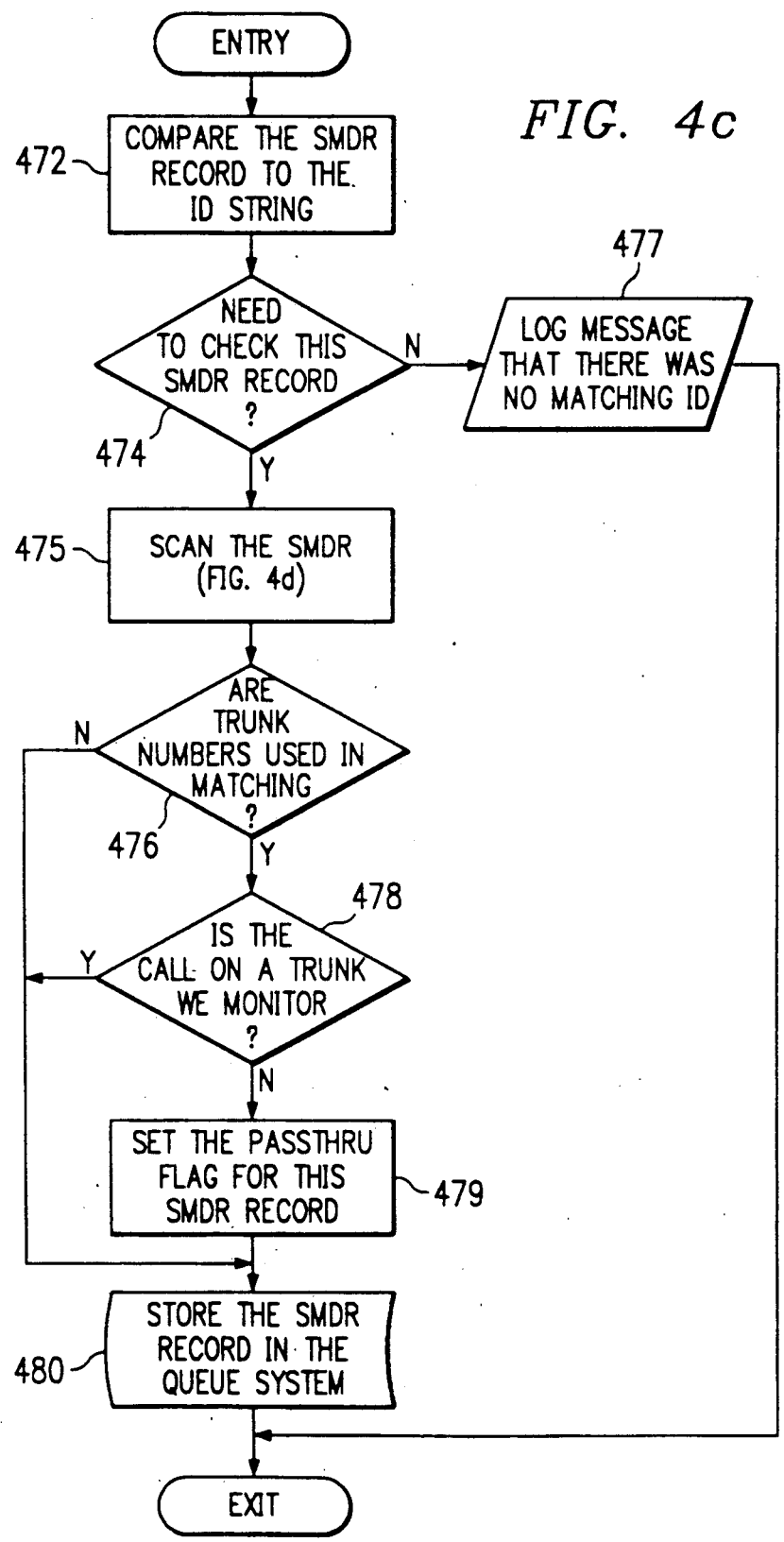

FIG. 4c illustrates the steps which comprise Process Record Block 468. Program flow begins at step 472 where the SMDR record received from the PBX system 16 is compared to the ID strings read from the configuration file as discussed previously. At step 474, it is determined whether there is a match between the SMDR record and an ID string of the configuration file. If there is no match, program flow proceeds to step 477 where an error message is printed and program flow exits out of SMDR Input Block 208. If the received SMDR record matches with an ID string of the configuration file, program flow proceeds to SMDR Scan Block 475 which will be described more fully with reference to FIG. 4d.

Program flow proceeds out of SMDR Scan Block 475 to step 476 where a decision is made on whether trunk numbers are used in matching SMDR data to call records. If trunk numbers are used in matching, then program flow proceeds to step 478 where a decision is made whether the call was made on a monitored trunk. If the call was not made on a monitored trunk, a "pass-thru" flag is set at step 479 for this SMDR record. Program flow then proceeds to step 480 where the SMDR record is stored in the queue system. If the call was made on a monitored trunk, then program flow proceeds from step 478 to step 480. If trunk numbers were not used in matching at step 476, program flow also proceeds directly to step 480. Once the SMDR record is stored in the queue system at step 480, program flow will exit SMDR Input Block 208 and proceed to SMDR matching block 210 of FIG. 2. The system of the present invention may be used to process call records associated with calls placed on only a portion of the trunks 14. Accordingly, steps 476 through 479 are used to mark records as "pass-thru" records when they are associated with calls placed on trunks which are not monitored by the system of the present invention.

Figure 4D:
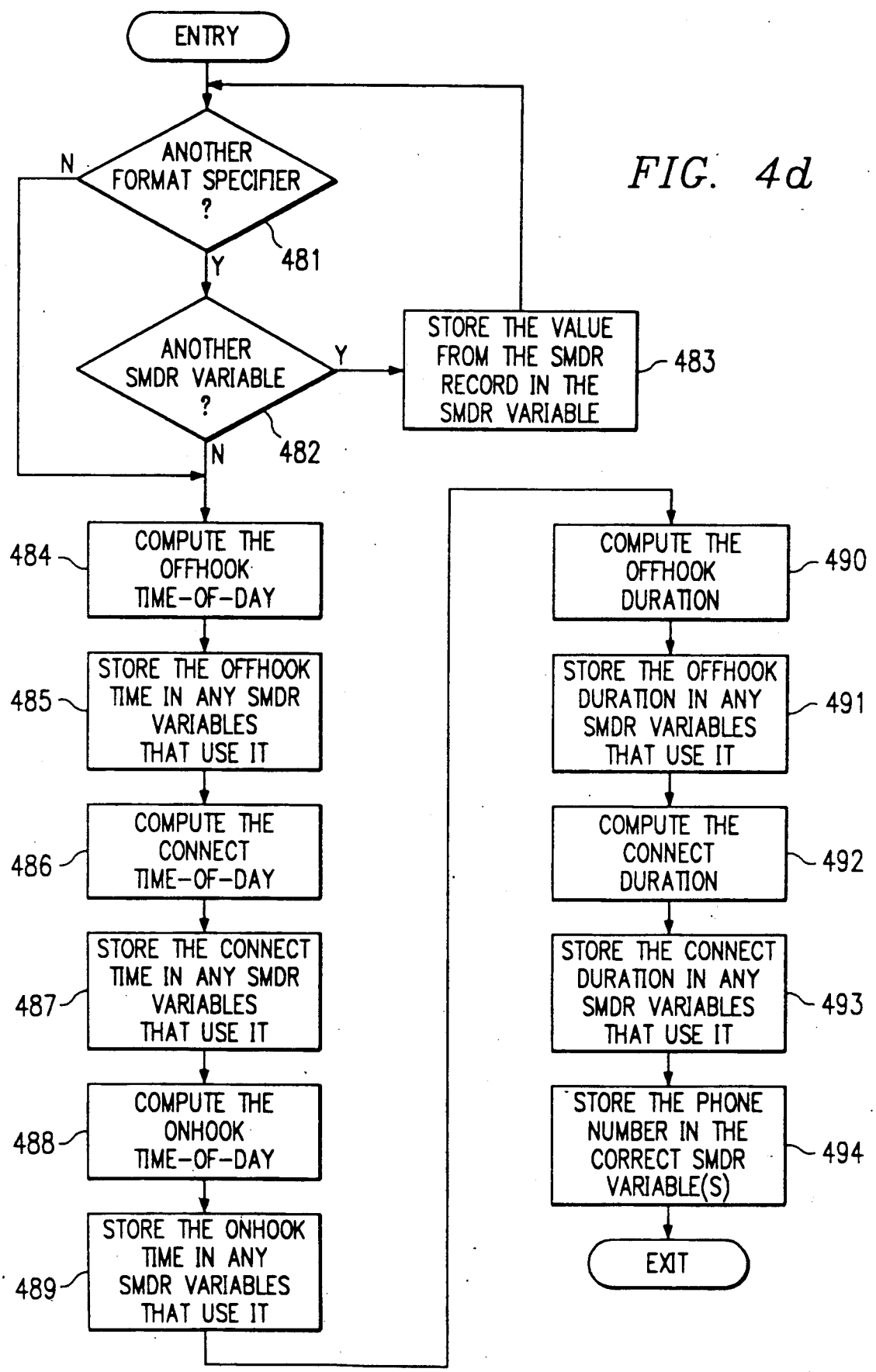

FIG. 4d illustrates the steps taken in SMDR Scan Block 475. Program flow proceeds to Step 481 where a format specifier from an appropriate format line of the configuration file is read. A format specifier comprises several characters within a format line and describes the number of data values which are to be expected for an identified variable. For each format specifier, program flow proceeds to step 482 which checks for a corresponding variable on the appropriate ARGS line of the configuration file. Program flow the proceeds to Step 483 which stores the value from the received SMDR record into the appropriate SMDR variable identified in the ARGS line which was previously marked as in use. Program flow then loops back to step 481 and continues until all the format specifiers and variables in the configuration file have been accounted for. When either the format specifiers or the SMDR variables from the configuration file have been exhausted, program flow proceeds to step 484. In general, steps 484 through 494 place some of the SMDR information into the appropriate call record format. For example, the off-hook time of day is computed and stored in steps 484 and 485. The connect time of day is computed and stored in steps 486 and 487. The on-hook time of day is computed and stored in steps 488 and 489. The off-hook duration is computed and stored in step 490 and steps 491. The connect duration is computed and stored in steps 492 and 493.

Figure 5A:
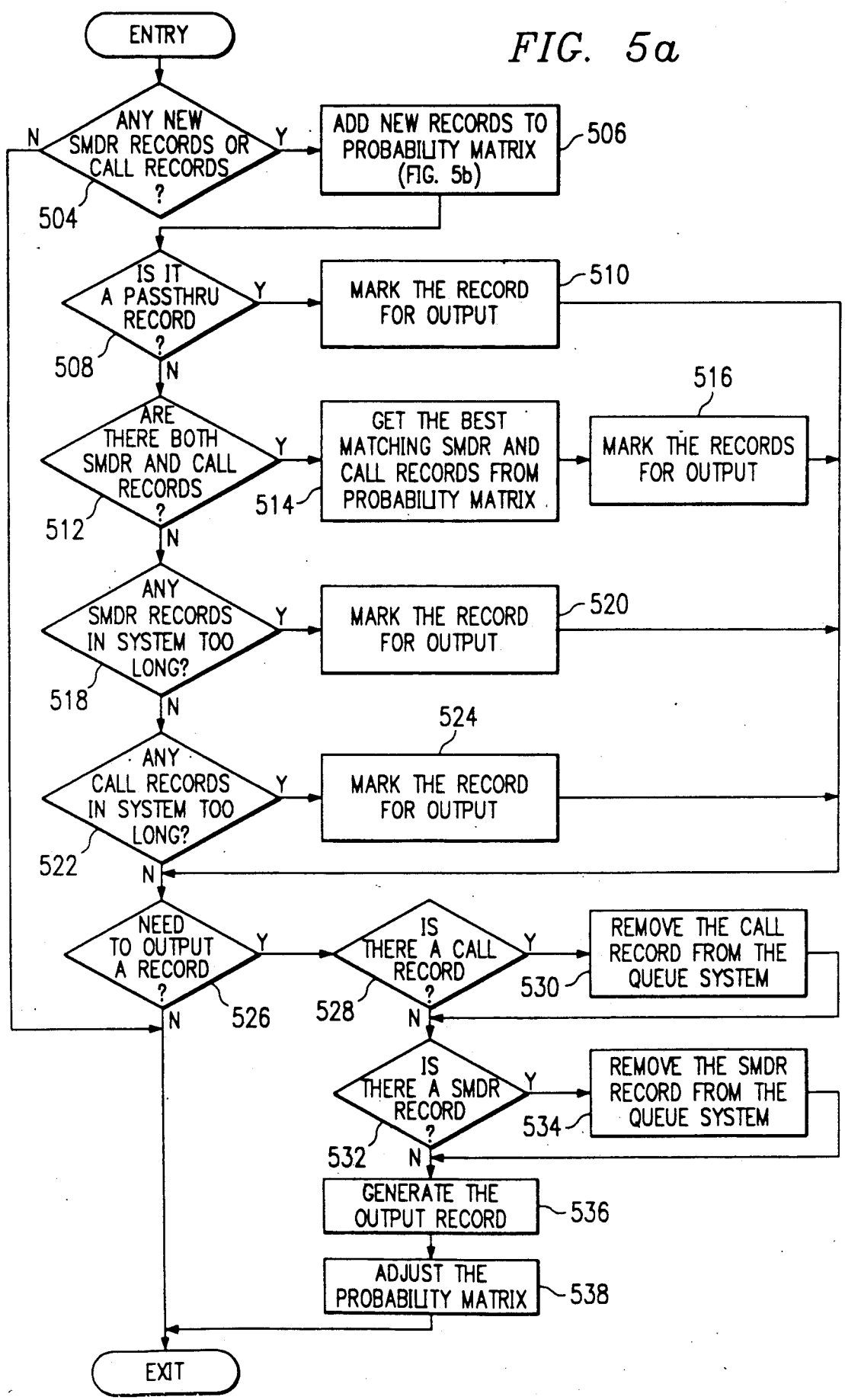
Figure 5B:
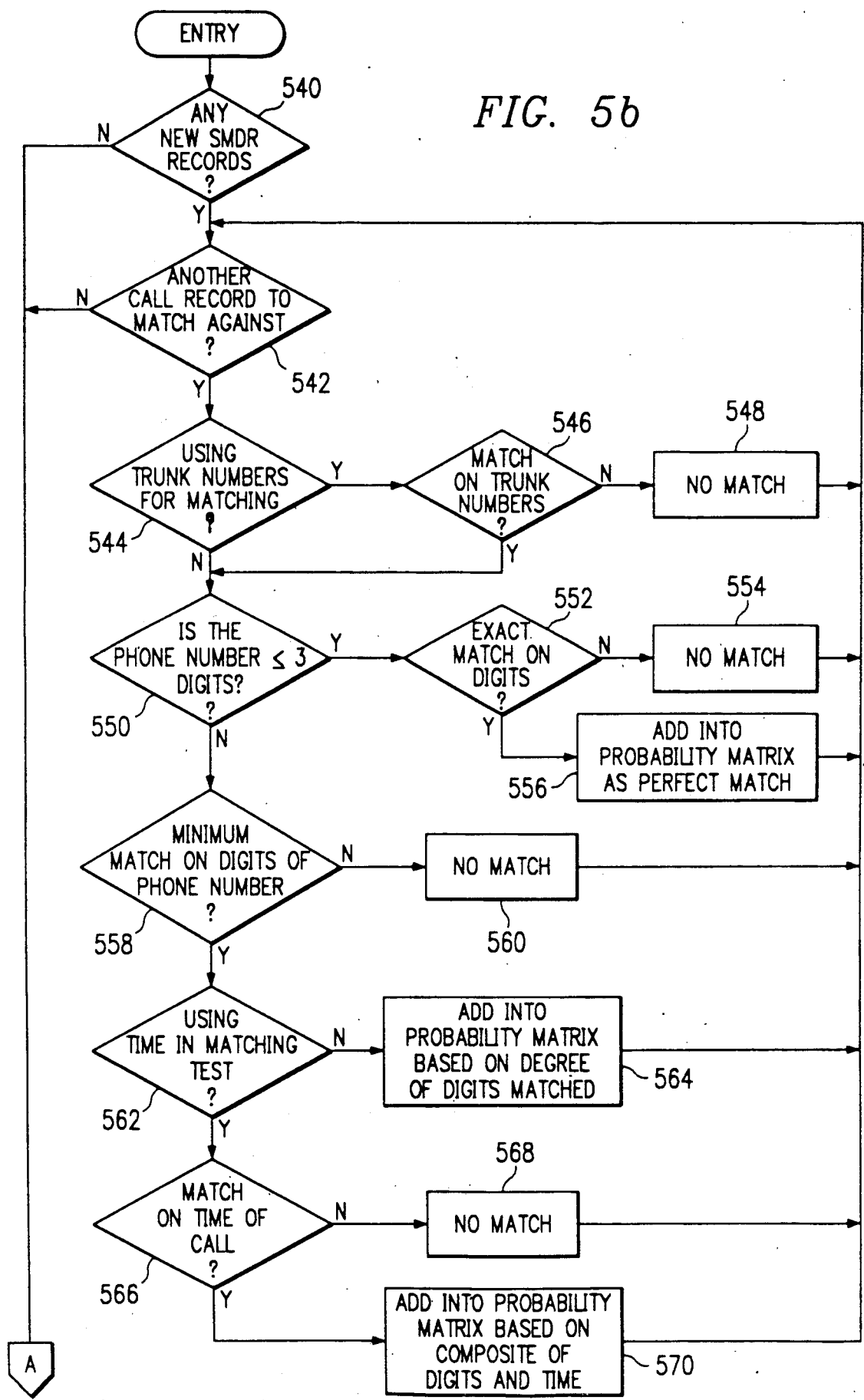
Figure 5B:
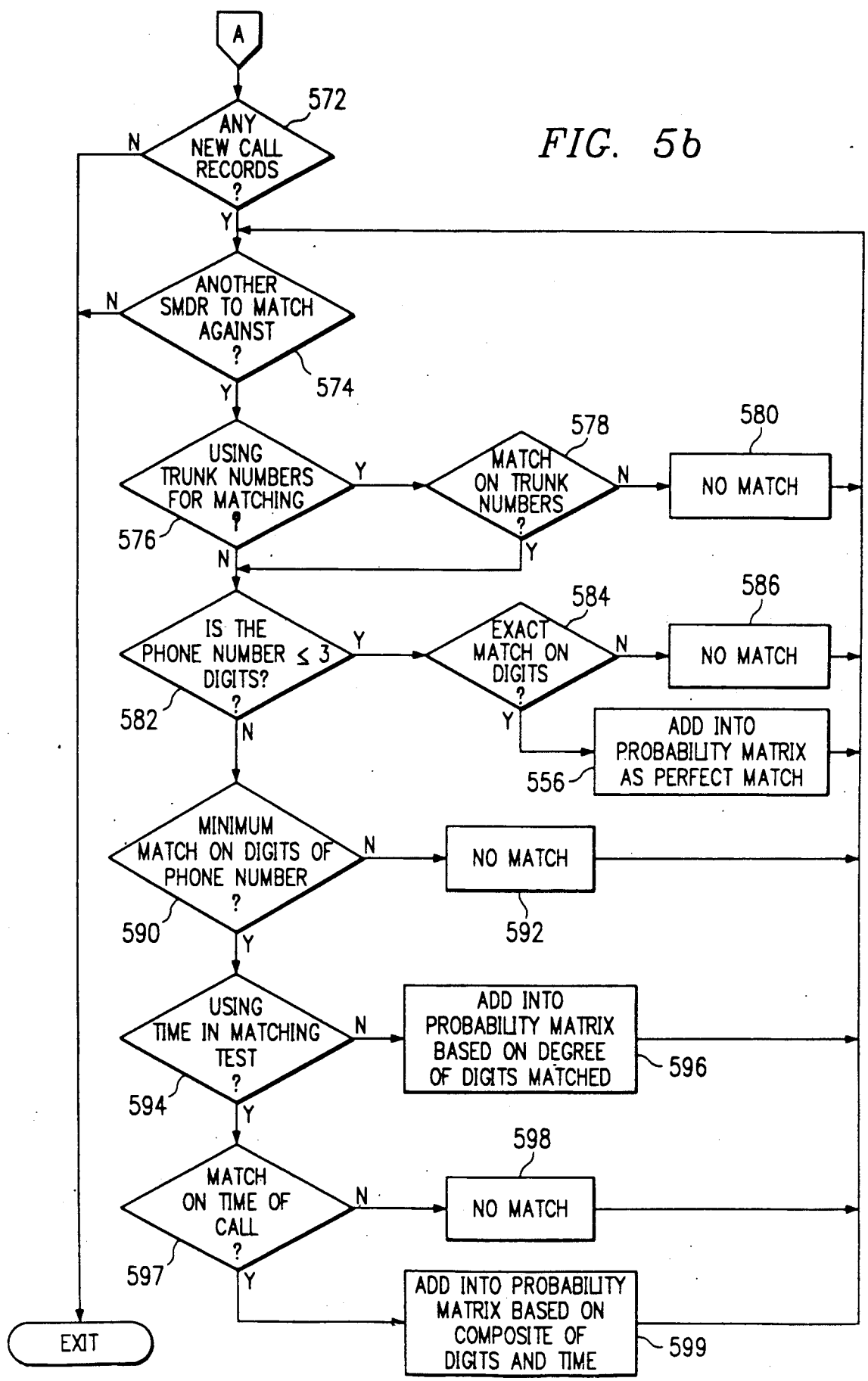

Finally, the phone number is stored in step 494. Program flow then proceeds to step 476 of FIG. 4c described previously FIGS. 5a and 5b illustrate the steps taken in SMDR Matching Block 210 of FIG. 2. Program flow enters SMDR Matching Block 210 at step 504. Step 504 inquires whether any new SMDR data or call records have been received or if there are any existing unmatched records. If no data records need to be processed, program flow exits out of SMDR Matching Block 210 since there are no records on which to perform the matching process. If there are records which need to be processed, program flow enters Block 506 where the records are added to a probability matrix. FIG. 5b describes in greater detail the steps taken in Probability Matrix Maintenance Block 506. At step 508, a determination is made whether the "pass thru" flag was set at step 479. If a "pass thru" flag was set, the record is marked for output at step 510 and program flow proceeds to step 526. If the "pass thru" flag was not set, program flow proceeds to step 512 which checks to see if there are both SMDR and call records in the queue system. If records are present in the queue system, program flow proceeds to step 514 where the best matching SMDR record and call record are located by finding the highest probability value resident in the probability matrix and these two records are marked for output at step 516. If there are not both SMDR records and call records in the queue system, program flow proceeds to step 518 where it is determined whether SMDR records have been in the system too long. If this is true, the appropriate SMDR records are marked for output at step 520. If SMDR records have not been in the system too long, an inquiry is made at step 522 if any call records have been in the system too long. If this is true, the call records are marked for output at step 524. If no call records have been in the system too long, program flow proceeds to step 526 where it is determined whether a record is ready for output. Program flow proceeds to step 526 each time a record is marked for output in steps 510, 516, 520 and 524. If no record is ready for output, program flow exits out of SMDR Matching Block 210 and enters step 212 of FIG. 2. If there is a record to be output, program flow proceeds to step 528 which determines whether a call record has been marked for output. If so, then the call record is removed from the queue system at step 530 and program flow continues to step 532. If at step 528 there is no call record marked for output, then program flow proceeds directly to step 532. At step 532, a determination is made whether an SMDR record was marked for output. If an SMDR record has been marked, the SMDR record is removed from the queue system at step 534 and program flow proceeds to step 536. If at step 532 there was no SMDR record marked for output, then program flow proceeds directly to step 536. At step 536, the SMDR record and call record are used to create the combined call record to be output to the call accounting system 32. This output record comprises the best information associated with a particular call as taken from both the SMDR record and the call record. The combined call record is then placed on the output queue. The system of the present invention also includes the capability to filter unwanted SMDR records generated by the PBX system 12. For example, if the call completion process within the PBX system 12 erroneously creates an SMDR record for a call which was actually not completed, the system of the present invention can detect the actual call duration (zero) using the call record generated by the call processing system 16 and remove the unwanted SMDR record from the records to be output to call accounting system 32. From step 536, program flow then proceeds to step 538 where the probability matrix is adjusted by deleting the records previously marked and removed from the queue system. The program then exits out of SMDR Matching Block 210 and enters SMDR Output Block 212 of FIG. 2.

FIG. 5b illustrates the specifics steps taken in block 506 when the probability matrix of the present invention is maintained as new data is added. Referring to FIG. 5b, program flow proceeds to step 540 where it is determined if there are any new SMDR records received. If so, then program flow enters a loop where the new SMDR record is compared against all the other call records with the comparisons being recorded in the probability matrix. Essentially, the probability matrix assigns a value to each pairing of call records and SMDR data records based on the probability that the records in each pair describe the same call. The pair with the highest probability can then be assigned to each respective call. The probability matrix may comprise a section of memory within call processing system 16 which is reserved for storage of the probability values for each pairing of SMDR and call records. Program flow proceeds to step 542 where a call record is retrieved to match against the new SMDR record. In step 544, an inquiry is made as to whether trunk numbers are used in the matching process. If trunk numbers are selected to be used in the matching process, and there is no match on the trunk numbers between an SMDR record and a call record, then the comparison in Step 548 will result in a "no match" and a zero probability value will be entered in the probability matrix for the appropriate pairing of the selected call record and SMDR record. If there was a match on trunk numbers at step 546 or if trunk numbers were not used in the matching in step 544, then program flow proceeds to step 550. At step 550, the phone number of the SMDR record is examined and it is determined if the phone number is three digits or less. If there are three digits or less, step 552 compares the SMDR phone number to the record phone number. If there is not a match, then program flow proceeds to step 554 and a zero probability or "no match" value is listed in the appropriate location in the probability matrix. If there is an exact match at step 552, the comparison is added into the probability matrix as a perfect match at step 556. If at step 550 the SMDR phone number contains more than three digits, program flow proceeds to step 558 where the SMDR phone number is compared to the call record phone number. At step 558, a minimum match of digits must occur before program flow proceeds to step 562. As an example, a minimum match may comprise of matching six of the seven phone number digits between the SMDR record and the call record. In this example, if only five digits match, program flow will proceed to step 560 where the comparison will be shown as a no match and listed as such in the appropriate location in the probability matrix. If a minimum number of digits match at step 558, program flow proceeds to step 562 where it is determined whether time is used in the matching. If time is not used, then a probability value associated with the comparison of step 558 will be added to the probability matrix at step 564 based on the number of digits which matched. If time is used in the matching process, program flow proceeds to step 566 which compares the time of the call of the SMDR record to that of the call record. If the time does not match, the comparison will result in a no match at step 568 and an appropriate zero probability value will be listed in the probability matrix. If there is a match on time, program flow continues to step 570 where the comparison is added to the probability matrix based on the number of digits matched and the time. After either a "no match" at steps 548, 554, 560, 568 or an addition to the probability matrix at steps 556, 564, or 570, program flow returns to step 542 where another call record is retrieved to match against the new SMDR record. The matching process continues between the new SMDR record and the next call record in the same manner as described above.

Once all new SMDR records are matched against all the other call records, program flow proceeds from step 542 to step 572 where an inquiry is made as to whether there are any new call records to be matched. If there is a new call record at step 572, then the new call record will be compared to each SMDR record as the new SMDR record was compared to each call record as performed above. These identical steps are shown in steps 572 through 599 in FIG. 5b. Once the new call record has been compared to each and every SMDR record and appropriate probability values have been entered into the probability matrix, program flow proceeds from step 574, out of Block 506, to step 508.

FIG. 6 describes in greater detail the steps performed in the SMDR Output Block 212 shown in FIG. 2. Program flow begins at step 600 where a determination is made whether there is an output port to check. If there is no output port to check, program flow exits, SMDR Output Block 212 and returns to step 206 shown in FIG. 2. If there is an output port to check, program flow proceeds to step 602 where a determination is made whether there is a current record to be output. As we discussed previously, a record to be output may comprise a combined record comprising data from either one or both of a matched call record and SMDR record or the record to be output may comprise a pass-thru record which is output without being modified. If there is a record to be output, program flow proceeds to step 610 where a loop is entered between step 610 and 612 which sends the characters of the current record character by character out the asynchronous output port. If there is no current record to be output at step 602, program flow proceeds to step 604 where it is determined whether there is a record resident in the queue system. If no such record exists, the program is exited. If there is a record in the queue system, program flow proceeds to step 606 where a determination is made whether the output port is enabled. If the output port is not enabled, the program flow exits. If the output port is enabled, program flow proceeds to step 608 where the record is taken out of the queuing system and is made the current record to be output. Program flow then enters the loop comprising step 610 and step 612 described previously until there are no more characters to send out the asynchronous output port. At this time, program flow proceeds to step 614 where the record is inserted into the free queue for reuse. Program flow then exits and returns to step 206 in FIG. 2.

In operation, the SMDR translation system of the present invention enables the merger of the best information available from a PBX system and a call recording system to allow for extremely accurate call accounting. In an exemplary situation, a PBX system can supply an extension number associated with a particular telephone call while the call accounting system can supply extremely accurate billing information associated with the call including an exact value for the duration of the call, the destination number of the call and a rate to be applied to the call. As described previously, this can be extremely useful in business environments to prevent inaccurate billing of calls for clients of the business. The system of the present invention can also be used to filter out SMDR records which are erroneously generated by the PBX system on non-completed calls by matching the appropriate call record generated by the call processing system with the accurate zero value for the call duration. The SMDR translation system of the present invention accomplishes the accumulation of data by receiving the SMDR records from the PBX system and the call records from the call processing system and matching the pairs of data using a probability matrix. The system of the present invention is extremely flexible through its use of configuration files which can provide an organizational template for any PBX or call accounting system to be used in association with the call processing system of the present invention. Additionally, because of the capability of the system of the present invention to include rating information in the records generated by the system, the system can in effect eliminate the need for a call accounting system and can output the generated combined call records directly to a property management system or a printer.

Although the present invention has been described in detail, it should be understood that various changes, substitutions and alterations can be made hereto without departing from the spirit and scope of the invention as defined by the appended claims.

WHAT IS CLAIMED IS:

1. A data processing system used in conjunction with a PBX system operable to output SMDR data records for calls placed through the PBX system and a call processing system coupled to the PBX system and operable to generate call records for calls placed through the call processing system, the data processing system comprising:
   circuitry for receiving the SMDR data records from the PBX system;
   circuitry for receiving the call records from the call processing system;
   circuitry for matching a particular SMDR data record and a particular call record associated with a particular call placed through the PBX system and the call processing system; and
   circuitry for creating a combined data record associated with said particular call comprising selected data from said particular call record and said particular SMDR data record.

2. The data processing system of claim 1 wherein the call records comprise rate information and a duration associated with each of the calls, the system further comprising circuitry for calculating a cost for said particular call using rate information and a call duration associated with said particular call, said combined data record comprising said cost.

3. The data processing system of claim 1 and further comprising:
   circuitry for detecting selected SMDR data records to be passed through the system unmodified; and
   circuitry for outputting said selected SMDR records to the call accounting system.

4. The data processing system of claim 1 wherein the data processing system is used in conjunction with a call accounting system, the data processing system further comprising:
   circuitry for outputting said combined data record to the call accounting system such that said selected data from said particular call record and said particular SMDR data record may be used to account for said particular call.

5. The data processing system of claim 1 wherein said circuitry for matching comprises:
   circuitry for generating a probability matrix comprising a plurality of probability values, each of said probability values associated with a pair of records, comprising one of the call records and one of the SMDR data records, each of said probability values indicative of the probability that a particular pair of records associated with each respective probability value represents an accurate match in that each record comprising said particular pair of records is associated with the same call.

6. The data processing system of claim 5 wherein said circuitry for matching further comprises:
   circuitry for retrieving a selected pair of records having the highest probability value, said selected pair of records comprising the data for the creation of said combined data record.

7. The data processing system of claim 4 and further comprising circuitry for reading a selected configuration file, said configuration file describing the organization of the SMDR data received from the PBX system and the organization of the combined data records output to the call accounting system.

8. A telecommunications system used in conjunction with a telecommunications network and a local PBX system operable to output SMDR data records for calls placed through the PBX system, the telecommunications system comprising:

a call processing system coupled between the PBX system and the telecommunications network, said call processing system operable to generate call records for calls placed through the call processing system;

a data processing system coupled to the PBX system and said call processing system, said data processing system operable to receive SMDR data from the PBX system and call records from said call processing system; and a call accounting system coupled to said call data processing system said call accounting system operable to receive combined data records from said data processing system, said data processing system comprising:

circuitry for receiving the SMDR data records from the PBX system;

circuitry for receiving said call records from said call processing system;

circuitry for matching a particular SMDR data record and a particular call record associated with a particular call placed through the PBX system and said call processing system;

circuitry for creating a combined data record associated with said particular call comprising data from said particular call record and said particular SMDR data record; and circuitry for outputting said combined data record to said call accounting system such that said data from said particular call record and said particular SMDR data record may be used to account for said particular call.

9. The telecommunications system of claim 8 wherein said circuitry for matching comprises:

circuitry for generating a probability matrix comprising a plurality of probability values, each of said probability values associated with a pair of records comprising one of the call records and one of the SMDR data records, each of said probability values indicative of the probability that a particular pair of records associated with each respective probability value represents an accurate match in that each record comprising said particular pair of records is associated with the same call.

10. The telecommunications system of claim 9 wherein said circuitry for matching further comprises:

circuitry for retrieving a selected pair of records having the highest probability value, said selected pair of records comprising the necessary data for the creation of said combined data record.

11. The telecommunications system of claim 8 and further comprising circuitry for reading a selected configuration file, said configuration file describing the organization of the SMDR data records received from the PBX system and the organization of said combined data records output to said call accounting system.

12. A data processing system used in conjunction with a PBX system operable to output SMDR data records for calls placed through the PBX system and a call processing system coupled to the PBX system and operable to generate call records for calls placed through the call processing system, the data processing system comprising:

circuitry for receiving the SMDR data records from the PBX system;

circuitry for receiving the call records from the call processing system;

circuitry for matching a particular SMDR data record and a particular call record associated with a particular call placed through the PBX system and the call processing system; and circuitry for detecting an erroneous SMDR data record responsive to particular data from said particular call record; and circuitry for eliminating said erroneous record from records to be output to the call accounting system.

13. The data processing system of claim 12 wherein said particular data comprises call duration data from said particular call record.

14. A method for processing data associated with calls placed using a PBX system and a call processing system; where the PBX system is operable to output SMDR data records associated with calls placed through the PBX system and where the call processing system is operable to output call records associated with calls placed using the call processing system, the method comprising the steps of:

receiving the SMDR data records from the PBX system;

receiving the call records from the call processing system;

matching a particular SMDR data record and a particular call record associated with a particular call placed through the PBX system and the call processing system; and creating a combined data record associated with the particular call comprising data from the particular call record and the particular SMDR data record.

15. The method of claim 14 wherein the method is used in conjunction with a call accounting system, the method further comprising the step of:

outputting the combined data record to the call accounting system such that the data from the particular call record and the particular SMDR data record may be used to account for the particular call.

16. The method of claim 14 wherein said step of matching comprises the step of:

generating a probability matrix comprising a plurality of probability values, each of the probability values associated with a pair of records comprising one of the call records and one of the SMDR data records, each of the probability values indicative of the probability that a particular pair of records associated with each respective probability value represents an accurate match in that each record comprising the particular pair of records is associated with the same call.

17. The method of claim 16 wherein said step of matching further comprises the step of:

retrieving a selected pair of records having the highest probability value, the selected pair of records comprising the data for the creation of the combined data record.

18. The method of claim 15 and further comprising the step of:

reading a selected configuration file, the configuration file describing the organization of the SMDR data received from the PBX system and the organization of the combined data records output to the call accounting system.

* * * * *

UNITED STATES PATENT AND TRADEMARK OFFICE
CERTIFICATE OF CORRECTION

PATENT NO. : 5,048,079

DATED : September 10, 1991

INVENTOR(S) : Craig J. Harrington et al.

It is certified that error appears in the above-identified patent and that said Letters Patent is hereby corrected as shown below:

Column 2, line 66, before "5a", insert -- FIGS. --.

Column 2, line 67, after "portion", delete -- , --.

Column 3, line 12, after "line 18", insert -- . --.

Column 3, line 64, before " processing", insert -- call --.

Column 5, delete lines 2-20 of table and insert as follows:
```
        -- %-28s (case0) %02n:%02n'%02n\" %4s\r\n"
ARGS    onmon,onday,onyr,onh,onm,onap,ext,tnm,asd,
        cdh,cdm,cds, tac
CASE 2
FMT     "%2n/%2n/%02n %2n:%02n%2s %n %1n
        %-28s $%5.2n %02n:%02n'%02n\" %4s\r\n"
ARGS    onmon,onday,onyr,onh,onm,onap,ext,tnm, asd
        chg,cdm,cds, tac
CASE 1
FMT     "%-s\r\n"
ARGS    tx0
CASE 97 ERRLOG
FMT     "ISMERROR: %-s\r\n"
ARGS    tx0
CASE 98 MAINT
FMT     "ISM MAINT: %-s\r\n"
ARGS    tx0
CASE 99
FMT     "%-s\r\n"
ARGS    tx0 --
```

Column 7, line 49, after "a", delete "pass-thru" and insert -- "pass-thru" --.

UNITED STATES PATENT AND TRADEMARK OFFICE
CERTIFICATE OF CORRECTION

PATENT NO. : 5,048,079

DATED : September 10, 1991

INVENTOR(S) : Harrington et al.

It is certified that error appears in the above-identified patent and that said Letters Patent is hereby corrected as shown below:

Column 8, line 8, after "until", delete "a" and insert -- an --.

Column 8, line 8, after "a", delete ""end of file"" and insert -- "end-of-file" --.

Column 8, lines 8 and 9, after "an", delete ""end of file"" and insert -- "end-of-file" --.

Column 8, line 10 and 11, after "no", delete ""end of file"" and insert -- "end-of-file" --.

Column 8, line 52, before "command", delete ""end of record"" and insert -- "end-of-record" --.

Column 8, line 54 and 55, after "the", delete ""end of record" and insert -- "end-of-record" --.

Column 9, line 56, after "SMDR", delete "initialization block" and insert -- Initialization Block --.

Column 10, line 19, after "on", delete ";" and insert -- , --

Column 10, line 28, after "the", delete ""end of record"" and insert --"end-of-record"--.

Column 10, line 35, after "an", delete "end-of-record" and insert -- " end-of-record".

Column 11, line 19, after "a", delete "null" and insert -- "null" --.

UNITED STATES PATENT AND TRADEMARK OFFICE
CERTIFICATE OF CORRECTION

PATENT NO. : 5,048,079

DATED : September 10. 1991

INVENTOR(S) : Harrington et al.

It is certified that error appears in the above-identified patent and that said Letters Patent is hereby corrected as shown below:

Column 12, line 12, after "flow", delete "the" and insert -- then --.

Column 12, line 33, after " previously ", insert -- . --.

Column 12, line 47, after "the", delete ""pass thru"" and insert -- "pass-thru" --.

Column 12, line 48, after "a", delete ""pass thru"" and insert -- "pass-thru" --.

Column 12, line 50, after "the", delete ""pass thru"" and insert -- "pass-thru" --.

Column 13, line 41, after "the", delete "specifics" and insert -- specific --.

Column 14, lines 22 and 23, after "a", delete "no match" and insert -- "no match" --.

Column 14, line 34, after "a", delete "no match" and insert -- "no match" --.

Column 18, line 17, after "system", delete ";".

UNITED STATES PATENT AND TRADEMARK OFFICE
CERTIFICATE OF CORRECTION

PATENT NO. : 5,048,079
DATED : September 10, 1991
INVENTOR(S) : Craig J. Harrington et al.

It is certified that error appears in the above-indentified patent and that said Letters Patent is hereby corrected as shown below:

Column 12, line 31, beginning with "Finally," should be part of previous paragraph.

Signed and Sealed this

Twenty-sixth Day of October, 1993

Attest:

BRUCE LEHMAN

Attesting Officer   Commissioner of Patents and Trademarks